(12) United States Patent
Meyer et al.

(10) Patent No.: US 7,272,988 B2
(45) Date of Patent: Sep. 25, 2007

(54) SHIFT KNOB

(75) Inventors: Jörg Meyer, Wagenfeld (DE); Klemens Meyer, Lemförde (DE); Jan Szekeres-Kriselius, Lembruch (DE)

(73) Assignee: ZF Lemförder Metallwaren AG (DE)

( * ) Notice: Subject to any disclaimer, the term of this patent is extended or adjusted under 35 U.S.C. 154(b) by 424 days.

(21) Appl. No.: 10/472,925

(22) PCT Filed: Dec. 2, 2002

(86) PCT No.: PCT/DE02/04413

§ 371 (c)(1),
(2), (4) Date: Sep. 23, 2003

(87) PCT Pub. No.: WO03/048611

PCT Pub. Date: Jun. 12, 2003

(65) Prior Publication Data

US 2004/0103744 A1    Jun. 3, 2004

(30) Foreign Application Priority Data

Dec. 3, 2001  (DE) ................................. 101 58 934

(51) Int. Cl.
*B60K 20/00* (2006.01)
(52) U.S. Cl. .......................... 74/473.3; 74/523; 74/529; 74/537
(58) Field of Classification Search ............... 74/473.3, 74/473.1, 473.21, 538, 537, 529, 539, 523
See application file for complete search history.

(56) References Cited

U.S. PATENT DOCUMENTS 5,458,017 A    10/1995  Kanematsu et al.
5,575,174 A *  11/1996  Kanematsu et al. ..... 74/473.23
5,617,760 A *  4/1997   Woeste et al. ........... 74/473.23
6,435,052 B1 * 8/2002   Ersoy et al. ................ 74/473.1
6,732,608 B2 * 5/2004   Suzuki ....................... 74/473.3

FOREIGN PATENT DOCUMENTS

| DE | 43 42 460  | 6/1994  |
| DE | 44 34 135  | 3/1996  |
| DE | 195 13 809 | 10/1996 |
| DE | 198 29 173 | 1/2000  |
| DE | 199 50 638 | 5/2001  |
| EP | 1 170 655  | 1/2002  |
| JP | 09183315   | 7/1997  |

* cited by examiner

*Primary Examiner*—Thomas R. Hannon
*Assistant Examiner*—James Pilkington
(74) *Attorney, Agent, or Firm*—McGlew and Tuttle P.C.

(57) ABSTRACT

A shift knob (1) for a gearshift lever (3) of an automatic transmission of a motor vehicle has a locking bar (5) guided axially in the gearshift lever (3) and a release button (2) which can be actuated manually for actuating the locking bar (5) in relation to the gearshift lever (3). The release button (2) is arranged in the shift knob (1) at the top end of the gearshift lever (3). The release button (2) is connected to the shift knob (1) by means of at least one lever arm (16) via a mounting site (17). The length of the lever arm (16) of the release button (2) is selected such in relation to the path traveled by the release button (2) during the actuation that the release button (2) performs an essentially linear movement.

21 Claims, 4 Drawing Sheets

SHIFT KNOB

FIELD OF THE INVENTION

The present invention pertains to a shift knob for a gearshift lever for an automatic transmission in a motor vehicle with a locking bar guided axially in the gearshift lever and with a release button that can be actuated manually for actuating the locking bar in relation to the gearshift lever, wherein the release button is arranged in the shift knob at the top end of the gearshift lever.

BACKGROUND OF THE INVENTION

DE 195 13 809 C1 provides example showing a gearshift lever for an automatic transmission in a motor vehicle, which has a locking bar guided axially movably at the gearshift lever and has manually movable means for actuating the locking bar relative to the gearshift lever. The means is arranged in a shift knob at the top end of the gearshift lever. The means for axially moving the locking bar comprises a toothed rack arranged at the locking bar and a toothed segment. The toothed segment engages the teeth of the toothed rack and is mounted pivotably in the shift knob and can be pivoted by pressing with a finger against a stopper guided linearly movably in the shift knob against the spring action of the locking bar in an angle range limited by stops.

Furthermore, DE 198 29 173 A1 shows a gearshift lever with a locking bar for an automatic transmission in a motor vehicle, which comprises a knob arranged at the top end of the gearshift lever, a locking bar guided axially at the gearshift lever and manually movable means for actuating the locking bar relative to the gearshift lever, wherein two of the means have sets of teeth engaging each other, and these means are arranged such that an approach of at least one of the means to the locking bar induces an axial movement of the locking bar. At least one of the set of teeth extends along a curve, and the effective force transmission by a first of the curve radii is greater than the force transmission of the second radius.

DE 199 50 638 A1 also shows a shifting device with a gearshift lever for an automatic transmission of a motor vehicle, which has a release mechanism for releasing the gearshift lever with a manual actuating element, wherein the gearshift lever is movable in at least one shift gate between at least two different shift positions and can be locked in these shift positions at least partially depending on different vehicle configurations. An elastic force transmission element is provided between the manual actuating element and the release mechanism.

The drawback of the shifting devices and gearshift levers known from the above-mentioned documents is especially that the initial linear forces needed for actuating the locking bar are relatively strong, so that very strong forces must be applied with the thumb at the beginning to actuate the shifting device. This results in a feeling of sticking while shifting, and the forces involved in the shifting are physiologically unfavorable.

A tilting movement of the operating shifter is likewise disadvantageous, because even though the force to be applied is reduced, the clearance of the operating shifter is nevertheless felt to be unpleasant.

Another drawback is that the shifting mechanisms described are complicated and consequently expensive to manufacture.

SUMMARY OF THE INVENTION

The object of the present invention is therefore to provide a shift knob for a gearshift lever for an automatic transmission in a motor vehicle, which improves the drawbacks of the state of the art and especially ensures the ergonomic design of the movements involved to guarantee a smooth shifting operation.

According to the invention, a shift knob for a gearshift lever of an automatic transmission of a motor vehicle is provided with a locking bar guided axially in the gearshift lever and with a release button that can be actuated manually for actuating the locking bar in relation to the gearshift lever. The release button is arranged in the shift knob at the top end of the gearshift lever. The release button is connected to the shift knob by means of at least one lever arm via a mounting site. The length of the lever arm of the release button is selected to be such in relation to the path traveled by the release button during the actuation that the release button performs an essentially linear movement.

The release button of the shift knob is advantageously mounted such that due to the long lever arm, only a small movement must be performed to actuate the release button over the largest possible radius, and this movement is consequently felt to be linear. Two lever arms are advantageously provided in order to guarantee increased lateral stability during the actuation of the release button.

Furthermore, it is advantageous that a linear movement of the actuating button is converted into a rotary movement of the deflecting lever, without the drawbacks of a linear guide appearing.

It is advantageous here, in particular, that a leg spring acts on the release button in each position such that it is free from clearance and therefore responds immediately to an actuation without a tilting movement and free play.

The lever arm may be mounted rotatably in the mounting site. The deflecting lever may be supported at an at least partially spherical end of the locking bar.

A support may be arranged in a recess of the shift knob.

The release button may be acted on by the leg spring such that the release button is free from clearance in each shift position. The deflecting lever may be in functional connection with a mount of the leg spring. The leg spring may be supported with a first leg on the support. The leg spring may be supported with a second leg on the deflecting lever. The length of the lever arm may be much greater than the distance between a mounting point of the deflecting lever and the mount of the leg spring.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
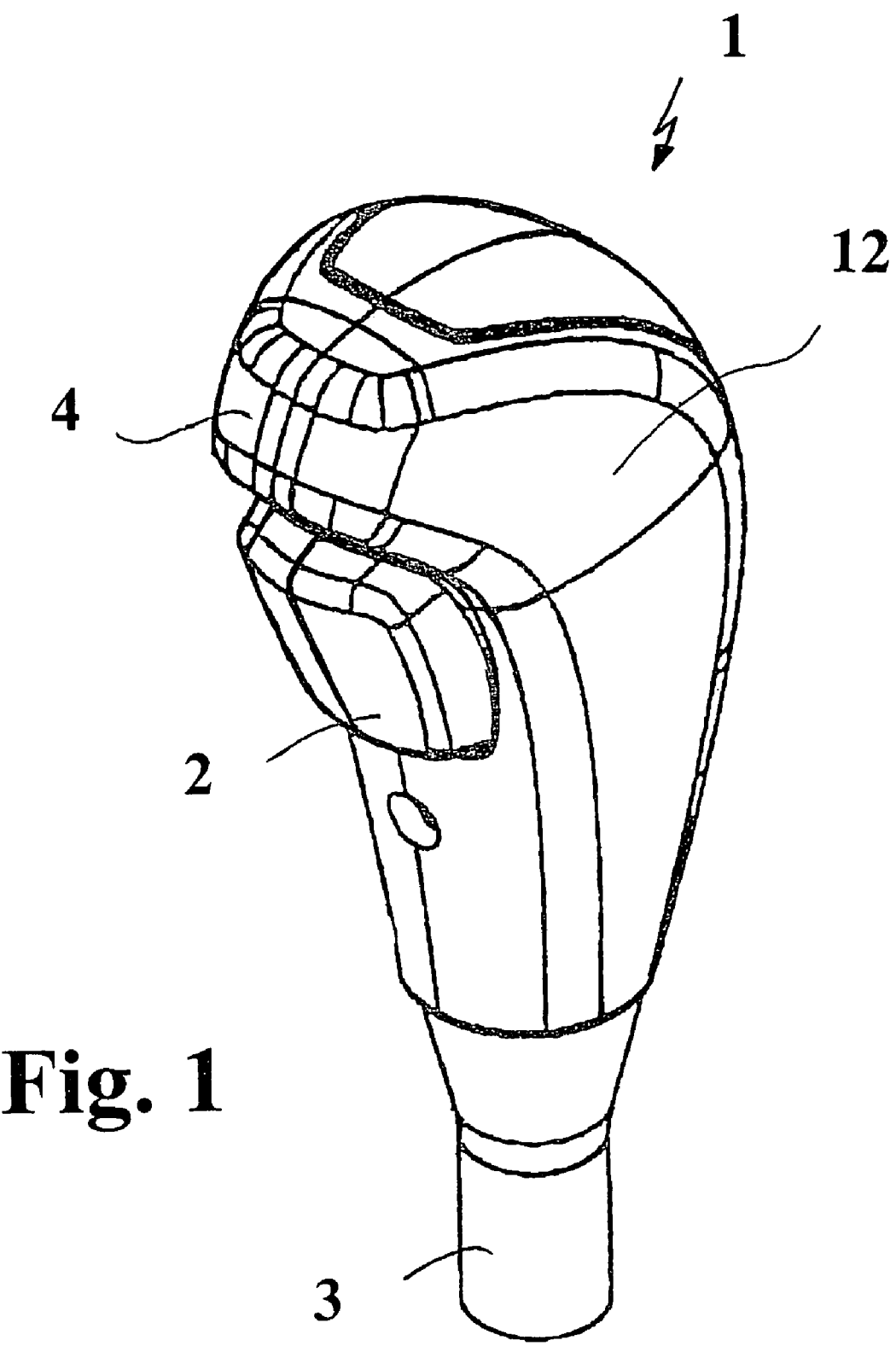
FIG. 1 is a schematic perspective view of a shift knob designed according to the present invention with release button.

Referring to the drawings in particular, FIG. 1 shows a schematic perspective view of a shift knob 1 designed according to the present invention with a release button 2. The shift knob 1 is arranged at an upper end of a gearshift lever 3 and is especially suitable for use in an automatic transmission in a motor vehicle.

FIG. 1 shows the release button 2 in a locked shift position, which will be described in greater detail below. The shift knob 1 is shaped ergonomically such that the a driver of the motor vehicle can grasp the shift knob 1 conveniently with the palm of his hand and can operate the release button 2 with the thumb to release a locking mechanism of the gearshift lever 3. The locking mechanism is used to prevent an unintended changeover between different positions of the gearshift lever 3 during the operation of the motor vehicle. For example, the position P is locked after R and vice versa, as well as position N is locked after R, where P is the parking position, R is the position for the reverse gear, and N is the neutral position. As a result, an accidental changeover of the gearshift lever 3, e.g., due to the gearshift lever 3 being caught, is avoided as a result, so that the motor vehicle cannot start moving unintentionally.

To guarantee that both an unintended actuation of the release button 2 and damage to this release button, e.g., due to the strap of a handbag being caught, are impossible, the release button is arranged, as is apparent from FIG. 1, such that a projection 4 in the upper part of the shift knob 1 projects over the release button 2 in the radial direction. This applies to both the first shift position shown in FIG. 3A and the second shift position shown in FIG. 3B. The projection may be formed, e.g., by an extruded part 12 of the shift knob 1.

Figure 2:
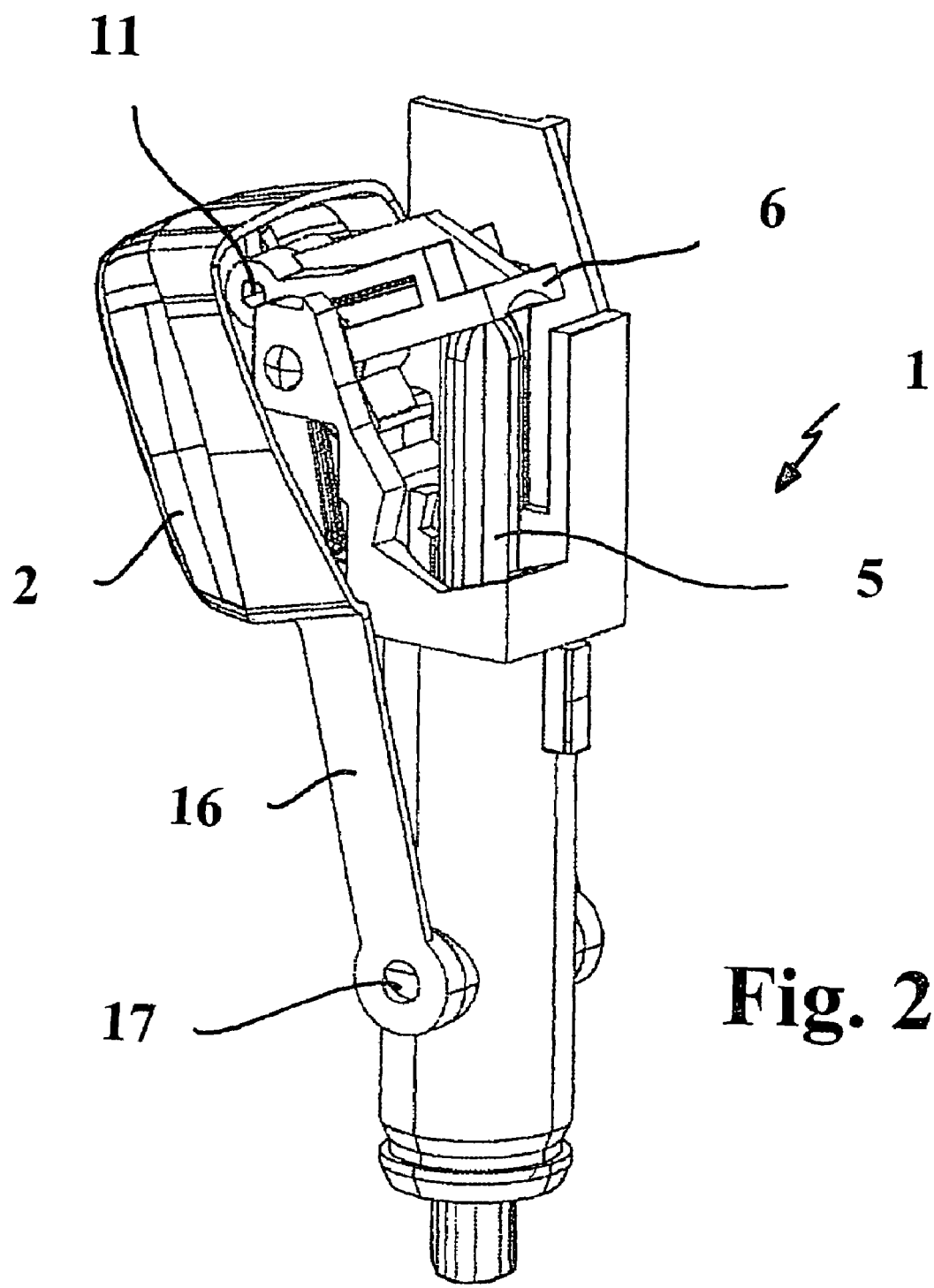
FIG. 2 is a schematic perspective view of the shift knob design according to the present invention without cover.

FIG. 2 shows a schematic perspective view of the shift knob 1 shown in FIG. 1 without the extruded part 12 as well as without other covers.

It can be recognized from FIG. 2 that the release button 2 is connected via two lateral lever arms 16 to the shift knob 1 at a mounting point 17. The lever arms 16 extend nearly over the entire length of the shift knob 1. If the release button 2 is pressed, this release button rotates or pivots via the lever arms 16 around the mounting point 17, as a result of which a deflecting lever 6 described in greater detail in FIGS. 3A and 3B acts on a locking bar 5 and actuates a locking mechanism, not shown in greater detail, as a result.

Figure 3A:
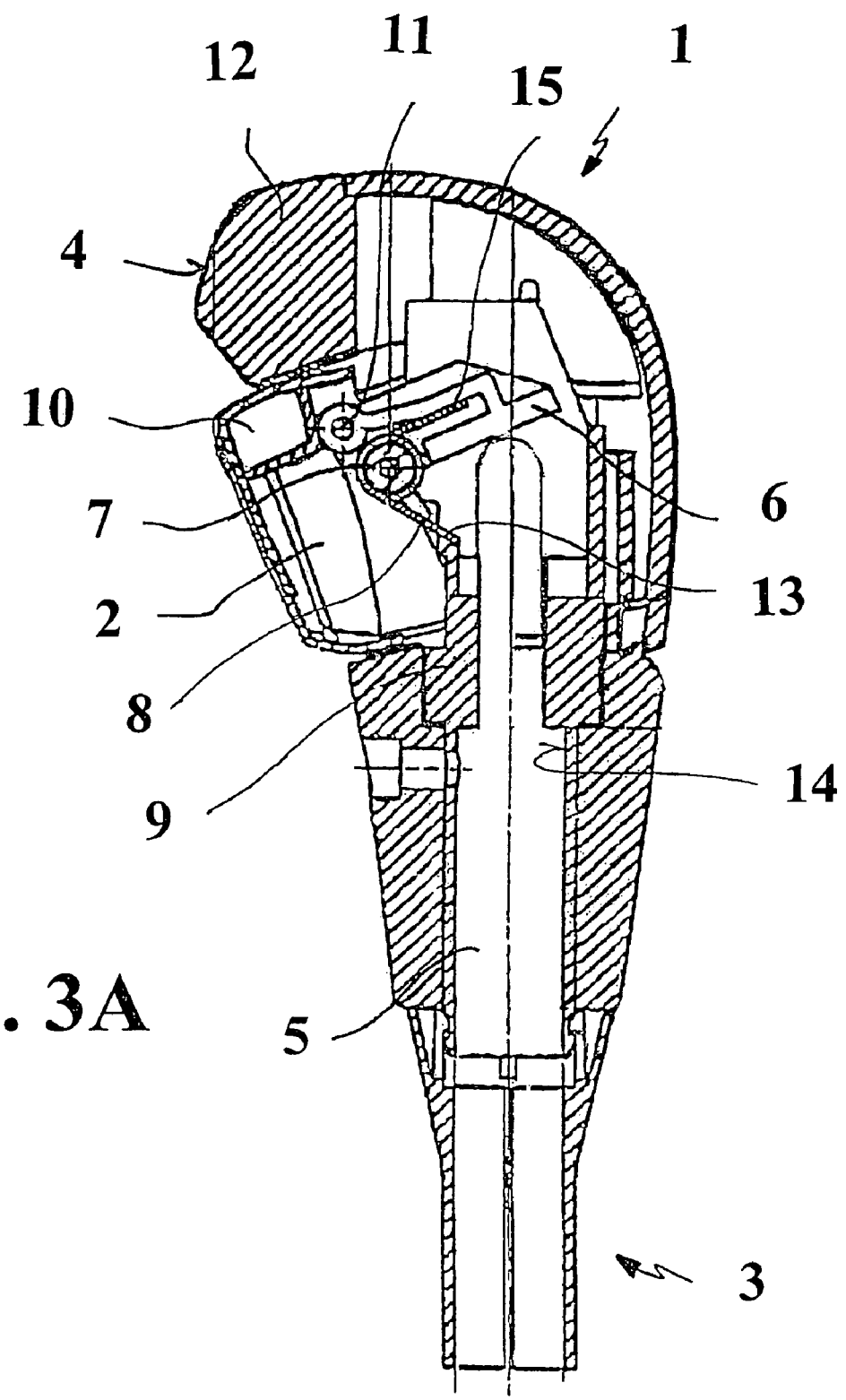
FIG. 3A is a longitudinal section through the shift knob designed according to the present invention in a first shift position.

FIG. 3A shows a longitudinal section through the shift knob 1 designed according to the present invention in a first shift position. The release button 2 is now in a non-depressed position, which corresponds to a locked gearshift lever 3. The lever arms 16 of the release button 2 are no longer visible due to the section plane selected.

In the locked position of the gearshift lever 3, the abovementioned deflecting lever 6 is in contact with an at least partially hemispherical top end of the locking bar 5 of the locking mechanism, which [locking bar] is acted on by a spring, not shown in detail, such that the release button 2 is held in its locked shift position without clearance. The deflecting lever 6 is in non-positive connection with a mount 7 of a leg spring 8, which is clamped between the deflecting lever 6 and a support 9, the support 9 having the form of a bearing sleeve in this case. The support 9 is arranged in a recess 14 of the shift knob 1. The leg spring 8 is supported at the support 9 with a first leg 13 and at the deflecting lever 6 with a second leg 15, so that the deflecting lever 6 is acted on by the leg spring 8 in each position of the release button 2. As a result, it is ensured that the release button 2 remains free from clearance. Tilting movements during the actuation of the release button 2 and free play can be avoided as a result.

Figure 3B:
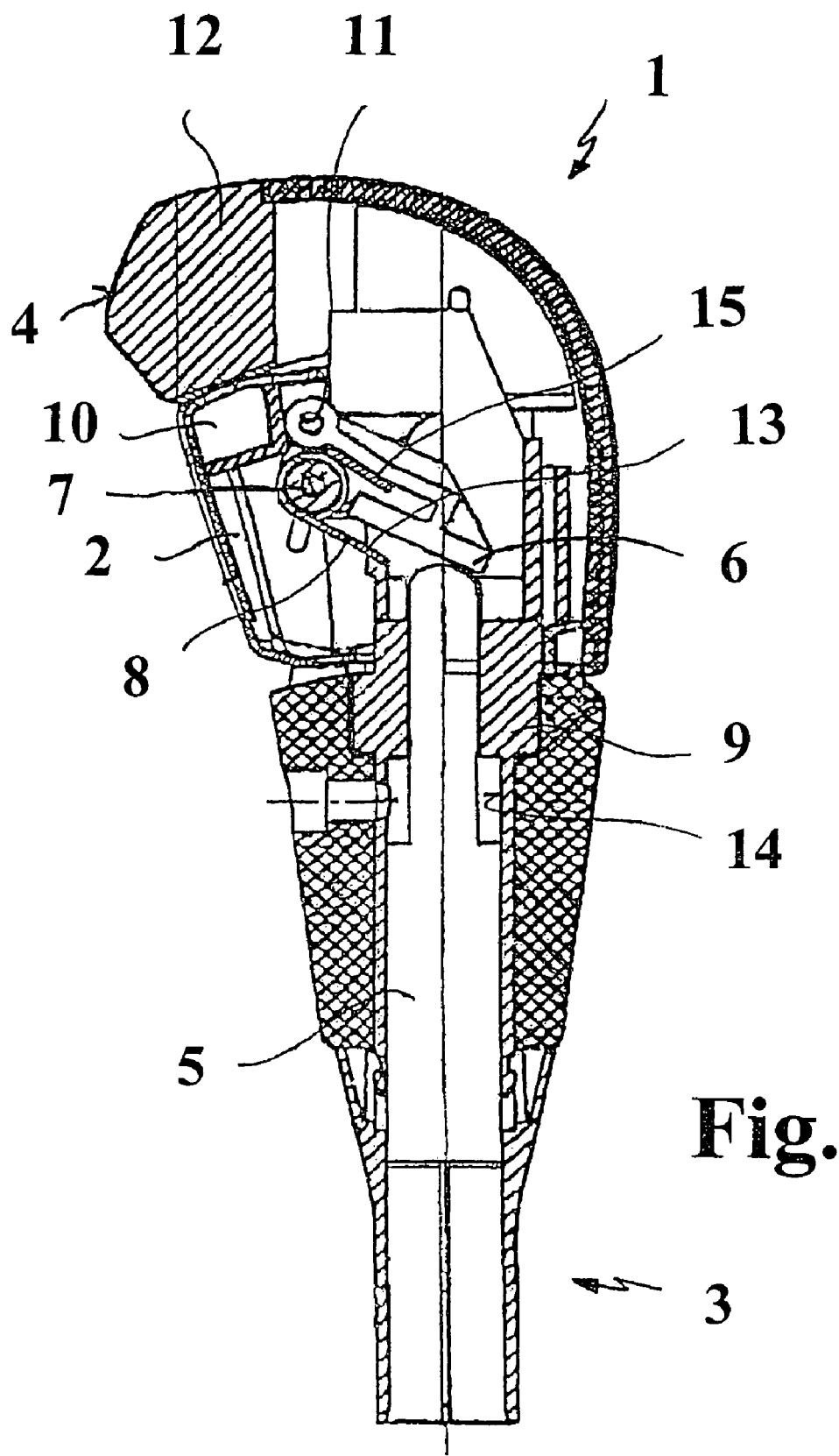
FIG. 3B is a longitudinal section through the shift knob designed according to the present invention in a second shift position.

If the release button 2 is pressed into the shift knob 1, as is shown in FIG. 3B, an actuating element 10, which is arranged in the release button 2, presses the deflecting lever 6 approximately linearly into the shift knob 1 due to the great length of the lever arms 16 of the release button 2 and brings about a clockwise rotary movement of the deflecting lever 6 due to the spaced locations of a mounting point 11 of the deflecting lever 6 and the mount 7 of the leg spring 8. The mounting point 11 of the deflecting lever 6 and the mount 7 of the leg spring 8 are now in functional connection with one another. As a result, the locking bar 5 in the gearshift lever 3 is pressed downward against the force of the spring, not shown, as a result of which the release mechanism, not shown in greater detail, will release the gearshift lever 3. Due to the fact that the length of the deflecting lever 6 or the distance between the mounting point 11 of the deflecting lever 6 and the mount 7 of the leg spring 8 is considerably shorter than the lever arms 16 of the release button 2, a rotary movement can be generated to release the release button 2 by a movement of the release button 2, which is felt by the user to be purely linear.

Due to the tension of the leg spring 8, the release button 2 is also acted on in this position such that it remains play-free. As a result, a defined, fixed pressure point, which immediately responds to pressure without free play or tilting movements, can be maintained in each shift position, which also includes intermediate positions, which are located, e.g., between the shift positions shown in FIGS. 3A and 3B.

Since the deflecting lever 6 is relatively long in comparison with the distance between the mounting site 11 of the deflecting lever 6 and the mount 7 of the leg spring 8, the rotary movement, which triggers the actuation of the locking bar 5, takes place over a relatively large radius. As a result, the impression that the release button 2 is actuated exclusively in a linear movement, which is felt to be more pleasant than a tilting movement, is reinforced in the user, without the drawbacks of a linear guide occurring.

While a specific embodiment of the invention has been shown and described in detail to illustrate the application of the principles of the invention, it will be understood that the invention may be embodied otherwise without departing from such principles.

The invention claimed is:

1. A shift knob for a gearshift lever of an automatic transmission of a motor vehicle, the shift knob comprising:
   a lever arm;
   a mounting site, said lever arm being rotatably mounted to said mounting site;
   a spring;
   a mount, said mount supporting said spring, said mount being located at a position offset from the position of said mounting site;
   a locking bar guided axially in said gearshift lever;
   a release button for manually actuating said locking bar in relation to said gearshift lever, wherein said release button is arranged in said shift knob at the top end of said gearshift lever, said release button being pivotally mounted to said shift knob by means of said lever arm via said mounting site, wherein the length of said lever arm of said release button is selected such that said release button performs a linear movement during actuation; and a deflecting lever formed independent of said release button, said deflecting lever being movable relative to said release button, said deflecting lever being in contact with said spring such that said release button is free from clearance in each shift position, said deflecting lever converting said linear movement of said release button into a rotary movement acting on said lock bar for releasing said locking bar, said deflecting lever pivoting about said mount relative to said release button when said release button pivots about said mounting site.

2. A shift knob in accordance with claim 1, wherein said deflecting lever is supported at an at least partially spherical end of said locking bar, said deflecting lever contacting said locking bar.

3. A shift knob in accordance with claim 1, wherein the length of said lever arm is greater than the distance between a mounting point of said deflecting lever and said mount of said spring.

4. A shift knob in accordance with claim 1, wherein said spring is supported with a first leg on a support.

5. A shift knob in accordance with claim 4, wherein said support is arranged in a recess of said shift knob.

6. A shift knob in accordance with claim 5, wherein said spring is supported with a second leg on said deflecting lever.

7. A shift knob in accordance with claim 1, wherein said deflecting lever is rotatable about said mount, said mount being adjacent to said deflecting lever.

8. A shift knob in accordance with claim 7, wherein said deflecting lever being connected to a mounting point, said mounting point being movable with respect to said mount, said mount being offset from said mounting site.

9. A shift knob in accordance with claim 8, wherein said gearshift lever comprising a support, said spring being supported at said support with a first leg and at said deflecting lever with a second leg.

10. A shift knob in accordance with claim 9, wherein said mounting point being offset from said mount.

11. A motor vehicle automatic transmission shift knob and gearshift lever comprising:
a gearshift lever;
a locking bar guided axially in said gearshift lever;
a shift knob at the top end of said gearshift lever, said shift knob having a mounting site;
a release button arranged in said shift knob and movable over a linear travel path from a locked position to an unlocked position;
a spring;
a mount for supporting said spring;
a deflecting lever formed as a separate element from said release button, said spring being in contact with said deflecting lever, said release button actuating said deflecting lever, said deflecting lever being movable with respect to said release button such said deflecting lever pivots about said mount and compresses said spring when said release button is actuated from said locked position to said unlocked position, said linear movement of said release button being converted into a rotary movement of said deflecting lever to release said locking bar in a linear direction, said spring maintaining said deflecting lever in a fixed position when said spring is in a non-compressed state, whereby said release button is maintained in said locked position when said spring is in said non-compressed state; and a lever arm pivotally mounted to said mounting site, said lever arm connecting said release button to said shift knob at said mounting site, said lever arm having a length longer than the travel path of said release button during the actuation.

12. A shift knob in accordance with claim 11, wherein said deflecting lever is supported at an at least partially spherical end of said locking bar.

13. A shift knob in accordance with claim 11, wherein said mounting site is offset from the mount of the spring, said mounting site having an axis of rotation, said deflecting lever being mounted to a mounting point offset from said axis of rotation of said mounting site and offset from said mount of said spring, said mounting point being movable relative to said mount of said spring.

14. A shift knob in accordance with claim 13, wherein said deflecting lever is rotatable about said mount.

15. A shift knob in accordance with claim 11, wherein said release button is acted on by the spring such that said release button is free from clearance in each shift position.

16. A shift knob in accordance with claim 15, wherein said deflecting lever is in functional connection with a mount of said spring.

17. A shift knob in accordance with claim 16, wherein the length of said lever arm is greater than the distance between a mounting point of said deflecting lever and said mount of said spring.

18. A shift knob in accordance with claim 15, wherein said spring is supported with a first leg on a support.

19. A shift knob in accordance with claim 18, wherein said support is arranged in a recess of said shift knob.

20. A shift knob in accordance with claim 19, wherein said spring is supported with a second leg on said deflecting lever.

21. A shift knob in accordance with claim 20, wherein the mount is arranged between said first leg and said second leg of said spring.

* * * * *